June 9, 1936.　　　T. B. TYLER　　　2,043,783

MEANS FOR RESTRAINING TRANSMISSION SHIFTS

Original Filed May 14, 1932

INVENTOR
*Tracy Brooks Tyler*

BY

ATTORNEYS

Patented June 9, 1936

2,043,783

UNITED STATES PATENT OFFICE 2,043,783

MEANS FOR RESTRAINING TRANSMISSION SHIFTS

Tracy Brooks Tyler, Detroit, Mich., assignor to The Monopower Corporation, Detroit, Mich., a corporation of Michigan Application May 14, 1932, Serial No. 611,382
Renewed November 15, 1935

9 Claims. (Cl. 74—325)

This invention relates to torque transferring devices more commonly known as transmissions and generally associated with automotive vehicles.

Transmissions for automotive vehicles generally have a plurality of selective engaging elements of different capacities, adapted to create different driving connections between the driving part of the transmission and the driven part of the same, the latter being coupled to a vehicle driving part such as the propeller shaft. There are provided as many sets of engaging elements as desired, and as far as the forward drive sets only are concerned, there are generally provided a low speed or high torque drive set, an intermediate (second) speed or intermediate torque drive set, and a high speed or low torque drive set. In addition there is provided a movable part, generally in the form of a slidable selector and shifter rail, which may be controlled to assume various positions. In one known transmission, the rail is mounted to have three forward drive positions, corresponding to the three forward driving relations to be created by the three sets of engaging elements, for example, the shifter rail will have a low speed or high torque position, a second speed or intermediate torque position, and a high speed or low torque position. In addition the shifter rail will have a neutral position corresponding to a situation wherein none of the engaging elements are engaged.

In such transmission, it is considered desirable to prevent certain of the sets of engaging elements being engaged at certain speeds. For example, when the vehicle is moving rapidly, with the high speed set of engaging elements engaged, it is desirable to prevent the other sets of engaging elements from becoming engaged. Similarly, when the vehicle is moving at an intermediate speed, for example, between twenty and thirty-five miles per hour, it is desirable to prevent the low speed set of engaging elements from being engaged. It is important, however, that under such conditions, the high speed set of engaging elements remain at all times, engageable or disengageable, at will.

The principal object of this invention is to provide in a transmission, means for accomplishing the results desired and set forth in the preceding paragraph.

Still further objects will become readily apparent from the following detailed description of a preferred embodiment of the invention and from the appended drawing, showing the same.

Figure 1:
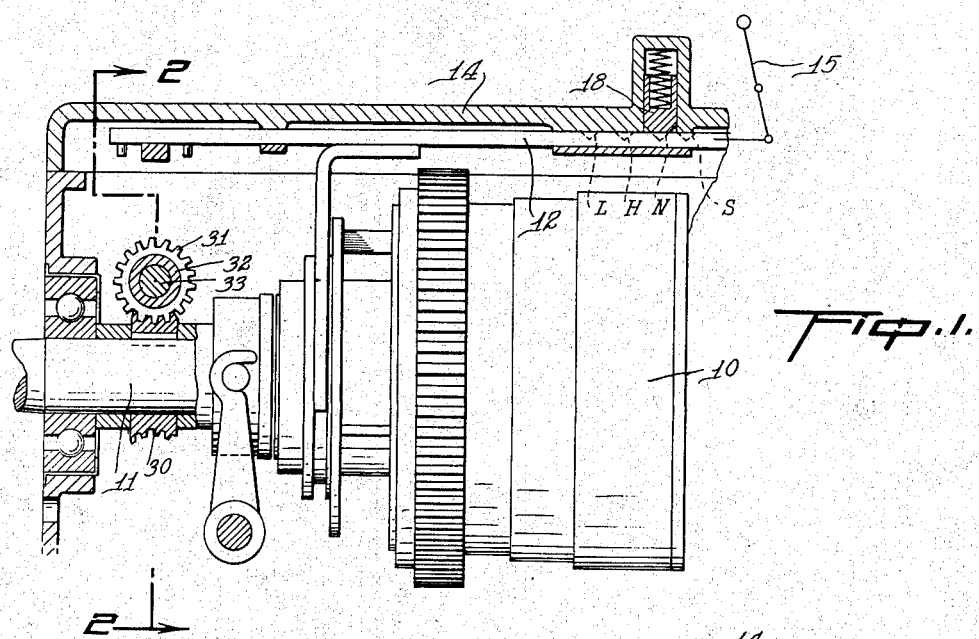
Figure 1 is a longitudinal fragmentary section view as if on the line 1—1 of Fig. 2, of parts associated with and forming part of an automotive vehicle transmission.

Referring to the drawing it will be seen that there is shown a transmission having a shell 10 containing a plurality of sets of engaging elements (not shown) and having a drive shaft, not shown, to which may be connected a driven shaft 11, the sets of engaging elements, when selected and engaged, as desired, creating selected driving connections between the drive shaft and the driven shaft. The driven shaft in turn may be coupled to the propeller shaft of a vehicle, by means not shown, and the speed of the driven shaft is always directly proportional to that of the vehicle, as will be readily understood.

The transmission, though not shown in detail, may well be and preferably is the one disclosed in the application of Tracy B. Tyler, Serial No. 614,349, filed May 31, 1932.

Selection and shifting of the sets of engaging elements in the transmission is accomplished through a part 12, which may be in the nature of a slidably mounted selector and shifter rail. The rail 12 may reciprocate in the transmission casing 14 by means indicated diagrammatically at 15, the latter comprising personally controllable means, such as the shifting lever shown, or automatically operating means, not shown. For purpose of convenience, it will be considered that the means 15 is a shift lever pivotally mounted in the transmission casing and connected to the rail 12 as indicated.

Further for purposes of convenience it will be considered that there are three sets of forward driving engaging elements in the transmission, which sets are here labeled low speed, second speed, and high speed sets. In such a case the rail 12 will have four positions, three corresponding to the three sets mentioned, and a fourth, called neutral position, which is the position of the rail when no engaging elements are engaged, that is to say, when there is no forward drive between the drive shaft and the driven shaft 11.

The shifter rail is provided with four substantially equally spaced conical depressions or notches in its upper surface labeled respectively, L, H, N, S, as indicated which are adapted to cooperate with a spring pressed conical plunger 18 in such a manner that the shifter rail will, at all times have one of its notches engaged by the plunger. As will be readily comprehended, when notch L is engaged by the plunger, that is to say, when the shifter rail has its extreme right position, Figs. 1 and 3, the low speed driving set will be engaged. Similarly when notch H is under plunger 18, that is to say, when the shifter rail is in one intermediate position, the high speed set will be engaged. When the notch N is under plunger 18, that is to say, when the shifter rail is in a second intermediate position, no set will be engaged. When notch S is under plunger 18, that is to say, when the shifter rail is in its extreme left position, Fig. 1, the second speed set will be engaged.

In order to prevent the shifter rail 12 from being moved, at times, out of its higher speed positions to a lower speed position without preventing other movements of the shifter rail, there are provided means correlated to the speed of the vehicle and now to be described.

In mesh with a worm gear 30 keyed to the driven shaft 11 is a pinion gear 31 fixed to a sleeve 32 journaled in a boss 32a and on a shaft 33 disposed transversely across the transmission casing. The shaft is mounted to slide in sleeve 32 and has one end supported in a boss 34 of the casing. The other end of the shaft is provided with enlargements 35 between which is loosely disposed a collar 36 to which are pivotally connected, at 37, links 38, these further being connected at 39 to weighted arms 40 which in turn are pivotally connected at 41 to a collar 42 fixed to the sleeve 32. The construction just defined forms in effect a centrifugal governor or speed sensitive means, controlled by the shaft 11, and serving to slide the shaft 33 axially to positions correlated to the speed of the driven shaft.

The shaft 33 is provided with a transverse pin 44 disposed in the notched end of a lever 45 which is pivoted at 46 to the casing and which at its upper end is pivotally connected by means of a tongue and slot connection 47 to an interfering or interlocking bar 48, the latter being mounted to slide in guides 49 attached to the cover of the casing. The bar is made narrow enough to pass between two pins 50 and 51 projecting downwardly from the shifter rail which is transverse to the interlocking bar 48, as indicated.

The spacing of the notches L, H, N, and S, and of the pins 50—51 relatively is of some importance and relative dimensions for the same are therefore indicated, although it will be understood that variations from these are permissible. The dimension "a" between the edge of the interfering bar and the pin 50 is at least equal to and preferably slightly greater than the spacing between the notches of the shifter rail. The dimension "c" between the other edge of the interfering bar and pin 51 is slightly greater than the spacing between the notches of the shifter rail. Further the pins 50 and 51 are disposed adjacent opposite edges of the shifter rail 12 for reasons to be observed.

The operation of the device to accomplish the results desired and described in the foregoing is as follows:—

Figure 2:
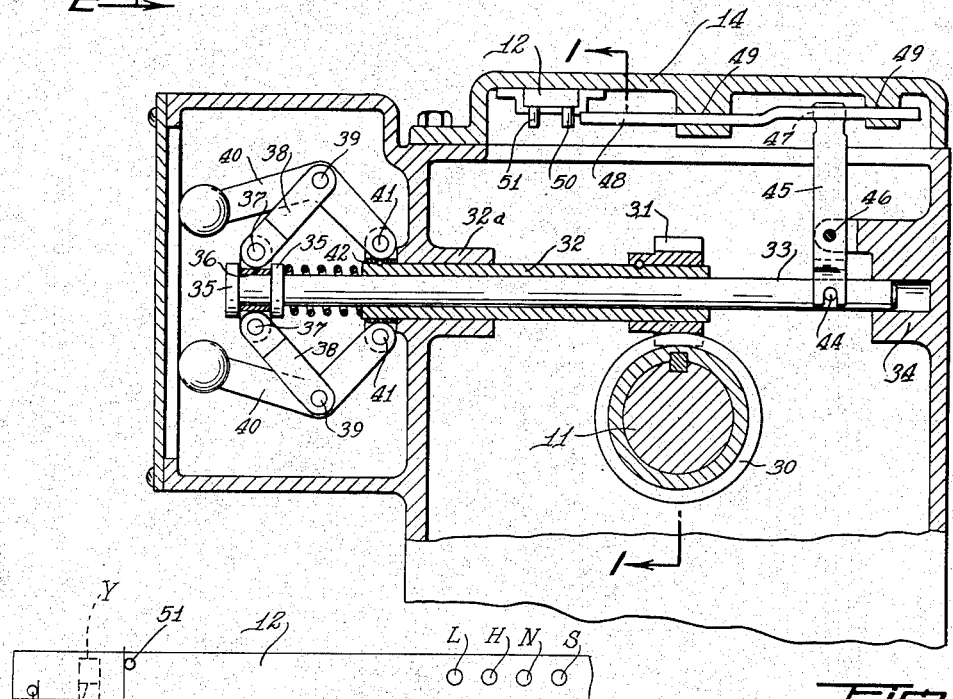
Fig. 2 is a transverse section view of the same and is taken on the line 2—2 of Fig. 1.
Figure 3:
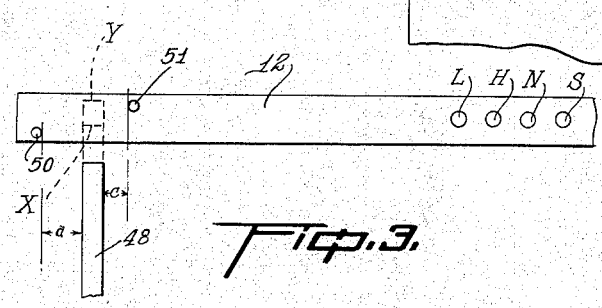
Fig. 3 is a partially diagrammatic top plan view as if looking down on Fig. 1.

When the speed of the driven shaft is low, corresponding to a speed of the vehicle below a predetermined critical speed of for example, twenty miles per hour, the interfering bar will be positioned by the speed sensitive means substantially in the position of Figs. 2 and 3, out of line with the pins 50 and 51 and not interfering with any movement of the shifter rail 12.

When the vehicle has attained a speed above that of the lower critical speed, twenty miles per hour, and below that of a higher critical speed, for example, thirty-five miles per hour, the interfering bar 48 will be moved halfway across the shifter rail, as indicated at X, Fig. 3. In this position the interfering bar will prevent the shifter rail, which should be and normally is in its second speed position, from being moved more than two notch spacings to the right or to low speed position. The rail, however, can be moved one spacing to the right, to neutral, or two spacings to the right, to high speed position. Similarly when the vehicle speed is above the higher critical speed, interfering bar 48 will be moved by the speed sensitive device to position Y, where it will prevent the shifter rail from being moved from high speed position, which it should then have, to any position but neutral, and where it will accordingly prevent engagement of the low speed or intermediate speed sets of elements.

It will also be observed that in the event the shifter rail is in such a position that its pins 50 and 51 are in the path of movement of the interfering bar, as in low and second speeds respectively, and if interfering bar, due to vehicle speed, is biased toward the shifter rail so as to abut and be stopped by either of these pins, the initial movement of the shifter rail, out of the position it then has, to high or neutral position, will permit the interfering bar to continue to be biased by the speed sensitive means so as to slide between the pins 50—51 and create an interlock, as will be observed.

It will further be seen that while the shifter rail is shown as having but three forward speeds any other number of speeds may well be provided, and the parts designed accordingly. Further while the selector and shifter rail 12 is shown in the form of a slidable rail it might well be a part mounted to move otherwise if desired.

Now having described the invention and a preferred embodiment thereof it will be understood that the same will be limited not to the specific details herein shown but by the claims which follow.

What I claim is:

1. In combination with a torque transmitting device for an automotive vehicle having a plurality of selectable sets of engaging elements adapted to create various driving connections between the driving part of the device and the driven part of the same, selectively, an interlock means connected to the driven part by speed sensitive means correlating the position of the interlock to the speed of the driven part progressively as the speed of the driven part changes, the interlock means when moved by the speed sensitive means, to various positions serving to respectively prevent relative engagement of various sets of the engaging elements of the device, said interlock means being adapted to permit engagement of various sets of engaging elements while in a locking position.

2. In combination with a torque transmitting device for an automotive vehicle having a plurality of selectable and shiftable sets of engaging elements adapted to create various driving connections between the driving part of the device and the driven part of the same, selectively, and also having a selector and shifter part movably mounted to have several positions corresponding to the various driving connections, an interlock means, speed sensitive means connecting the interlock means to the driven part and correlating the position of the interlock to the speed of the driven part, and means on said selector and shifter part engaged by the interlock means whereby said interlock means, when moved by the speed sensitive means to various positions, engages said means on said selector and shifter part to permit movement of the selector and shifter part within a definite range.

3. In combination with a torque transmitting device for an automotive vehicle having a plurality of selectable and shiftable sets of engaging elements adapted to create various driving connections between the driving part of the device and the driven part of the same, selectively, and also having a selector and shifter part movably mounted to have several positions corresponding to the various driving connections, an interlock means, speed sensitive means connecting said interlock means to said driven part and correlating the position of the interlock to the speed of the driven part, and means on said selector and shifter part engaged by the interlock means whereby said interlock means, when moved by the speed sensitive means to various positions, engages said means on said selector and shifter part to restrain movement of the selector and shifter part to prevent the latter from being moved to undesired positions, but permitting the latter to be moved to desired positions.

4. In combination with a torque transmitting device for an automative vehicle having a plurality of selectable and shiftable sets of engaging elements adapted to create various driving connections between the driving part of the device and the driven part of the same, selectively, and also having a selector and shifter part movably mounted to have several positions corresponding to the various driving connections, an interlock means, speed sensitive means connecting said interlock means to said driven part and correlating the position of the interlock to the speed of the driven part, and means on said shifter part engaged by the interlock means whereby said interlock means, when moved by the speed sensitive means to a position corresponding to a driven part speed above a predetermined speed, only engages said means on said selector and shifter part to prevent the selector and shifter part being moved to a position or positions corresponding to driving connection or connections for speeds below the predetermined speed.

5. In combination with a torque transmitting device for an automotive vehicle having a plurality of selectable and shiftable sets of engaging elements adapted to create various driving connections between the driving part of the device and the driven part of the same, selectively, and also having a selector and shifter part movably mounted to have several positions corresponding to the various driving connections, an interlock means, speed sensitive means connecting said interlock means to said driven part and correlating the position of the interlock to the speed of the driven part, and means on said shifter part engaged by the interlock means whereby said interlock means, when moved by the speed sensitive means to a position corresponding to a driven part speed above a predetermined speed, engages said means on said selector and shifter part to prevent the selector and shifter part being moved to a position or positions corresponding to driving connection or connections for speeds below the predetermined speed, but permitting other movement of the selector and shifter part.

6. The combination with a movable shifter part adapted to create various driving connections between a drive and driven member in an automobile transmission by sequent movements thereof, of speed sensitive means operated by said driven member, a lockout member connected to said speed sensitive means and adapted to be positioned relative to said movable shifter part and adapted to change its position as speed of the driven member changes, and means on said shifter part adapted for engagement with said lockout member whereby said engagement permits a predetermined movement to engage a predetermined connection and at the same time prevent another predetermined movement to prevent another predetermined connection.

7. In a transmission having neutral, low, second, and high speed drive connection members, shifter means adapted to be moved to different positions for selectively engaging any one of said connections at one time, a lockout member adjacent said shifter means, means operated by a a moving part in said transmission for moving said lockout member to various positions corresponding to the speed of said moving part, and means on said shifter part engaged by said lockout means for preventing movement of said shifter part from a high speed drive position to any position except neutral.

8. In a transmission having neutral, low, second, and high speed drive connection members, shifter means adapted to be moved to different position for selectively engaging any one of said connections at one time, a lockout member adjacent said shifter means, means operated by a moving part in said transmission for moving said lockout member to various positions corresponding to the speed of said moving part, and means on said shifter part engaged by said lockout means at a predetermined rate of movement of said moving part for permitting movement of said shifter part from second speed position to high or neutral positions and for preventing movement to low speed position.

9. In a transmission having neutral, low, second, and high speed drive connection members, shifter means adapted to be moved to different position for selectively engaging any one of said connections at one time, a lockout member adjacent said shifter means, means operated by a moving part in said transmission for moving said lockout member to various positions corresponding to the speed of said moving part, and means on said shifter part engaged by said lockout means to prevent certain movements and to permit certain movements of said shifter part, said means being arranged to permit free movement of said shifter part from neutral position to low position or from low position to neutral position or low position to second position at all times.

TRACY BROOKS TYLER.